(12) United States Patent
Keener et al.

(10) Patent No.: US 6,638,381 B2
(45) Date of Patent: Oct. 28, 2003

(54) METHOD FOR PREPARING ULTRA-FINE GRAIN TITANIUM AND TITANIUM-ALLOY ARTICLES AND ARTICLES PREPARED THEREBY

(75) Inventors: Steven G. Keener, Trabuco Canyon, CA (US); Edward Litwinski, Mission Viejo, CA (US)

(73) Assignee: The Boeing Company, Chicago, IL (US)

( * ) Notice: Subject to any disclaimer, the term of this patent is extended or adjusted under 35 U.S.C. 154(b) by 120 days.

(21) Appl. No.: 10/022,882

(22) Filed: Dec. 18, 2001

(65) Prior Publication Data

US 2003/0111147 A1 Jun. 19, 2003

(51) Int. Cl.⁷ .................................................. C22F 1/18
(52) U.S. Cl. ........................ 148/669; 148/671; 148/512; 148/714; 29/408; 29/410
(58) Field of Search ................................ 148/669, 671, 148/512, 714; 29/408, 410

(56) References Cited

U.S. PATENT DOCUMENTS

| | | | |
|---|---|---|---|
| 4,850,772 A | | 7/1989 | Jenkins |
| 5,054,980 A | | 10/1991 | Bidefeld |
| 5,160,554 A | * | 11/1992 | Bania et al. ............... 148/407 |
| 6,045,634 A | * | 4/2000 | Annavarapu ............... 148/671 |
| 6,398,883 B1 | * | 6/2002 | Forrest et al. ............. 148/516 |

FOREIGN PATENT DOCUMENTS

| EP | 1162283 A2 | * 12/2001 | ............. C22F/1/04 |
|---|---|---|---|

* cited by examiner

Primary Examiner—John Sheehan
Assistant Examiner—Andrew L. Oltmans

(57) ABSTRACT

A method for preparing ultra-fine grain titanium or titanium-alloy articles used for adjoining or assembling of detail components. Coarse-grained titanium or titanium-alloy materials typically are heated and forced under constant pressure through a friction stir processing tooling device containing a stirring chamber and a stirring rod. As the material is passed through the stirring chamber, the stirring rod solutionizes the titanium or titanium-alloy material and stirs the material to obtain a homogeneous or uniform material condition. As the processed material exits the stirring chamber of the friction stir process tooling device, it reconsolidates as an extremely homogeneous structure possessing ultra-fine grain structure. Titanium or titanium-alloy materials having been processed to achieve such ultra-fine grain material structure may then be manufactured into aerospace structural articles or components such as fasteners or articles that do not require a subsequent thermal or heat-treatment steps. The resulting fasteners, articles or components have improved material performance characteristics associated with this ultra-fine grain material structure.

17 Claims, 2 Drawing Sheets

METHOD FOR PREPARING ULTRA-FINE GRAIN TITANIUM AND TITANIUM-ALLOY ARTICLES AND ARTICLES PREPARED THEREBY

TECHNICAL FIELD

The present invention generally relates to a method for preparing titanium and titanium-alloy articles and more specifically to a method for preparing ultra-fine grain titanium and titanium-alloy articles and articles prepared thereby.

BACKGROUND ART

Currently, in the fabrication of titanium and titanium-alloy articles, thermal or heat-treating processes are included in the manufacturing process. These steps are to ensure that material grain size is produced and maintained at a level that is as small as possible. As such, it is the normal practice to employ a full annealing, i.e. recrystallization, or at least stress-relieving heat treatment steps in conjunction with any cold work or forming performed on the material. There have been exhaustive attempts to eliminate these thermal or heat-treating manufacturing process steps, which can account for up to approximately 20% of the costs associated with producing a titanium or titanium-alloy article such as a fastener, a rivet, a lockbolt or a threaded pin.

The grain size of a material formed is critical to both its ductility and strength among other properties. In general, grain sizes larger that ASTM 3 are not desirable for most cold-work or cold-forming operations. A duplexed grain size, defined as a significant difference in grain size depending upon location, should be avoided. Grain size is of special importance and generally increases in the degree of importance as the material is formed or mechanically-deformed to larger levels. As a rule, the finer the grain, the better the resulting formability. Recent research by Gysler et al. on "Influence of Grain Size on the Ductility of Age-Hardened Titanium Alloys" and Thomas et al. on "Friction Stir But Welding," which are herein incorporated by reference, have documented the directly proportional relationship between smaller grain size and improved material properties in titanium and titanium-alloy materials.

Friction stir welding ("FSW") or more generally, friction stir processing ("FSP"), is a solid-state process that uses a nonconsumable tool to join various types of metals. When a FSP rotating tool is inserted into and traverses through the materials, the tool plasticizes the materials and forces the materials to flow around the tool where they reconsolidate. As has been demonstrated with aluminum-alloy materials, FSP produces ultra-fine grain material structures in the "nugget" area of the processed material. From tests on aluminum-alloy materials, it has been determined that this resulting nugget material has shown improved material properties, the majority of which are directly dependent on grain size.

It is thus highly desirable utilize the FSP technology to form titanium or titanium-alloy articles having ultra fine grain metallurgical structures without a subsequent thermal or heat-treating processing step.

SUMMARY OF THE INVENTION

The present invention utilizes an FSP process to form a titanium or titanium-alloy article thereby producing a material with reduced grain size as well as improved homogeneity. This generates material structure having improved properties without the use of subsequent thermal or heat-treating procedures. Consequently, the overall manufacturing process for titanium or titanium-alloy articles such as fasteners can be shortened, thereby reducing manufacturing costs and eliminating the possibility of fasteners being improperly heat-treated.

Also, associated improved mechanical properties such as ductility and fracture toughness may be realized as a result of the resultant ultra-fine grain metallurgical structure within the article produced by the FSP as compared with articles produced using the prior or current art manufacturing processes. This could lead to substantial cost reduction depending upon the application of the articles produced using this process. For example, fasteners made according to this new process used in the aerospace industry could be reduced in size and still have the same mechanical properties. Further, these increased mechanical properties could lead to an overall reduction in the quantity of fasteners needed to secure together or assemble detail components. Both quantity and reduced size of fasteners could thus lead to further increased cost and labor savings as compared with the prior art.

BEST MODES FOR CARRYING OUT THE INVENTION

Figure 1:
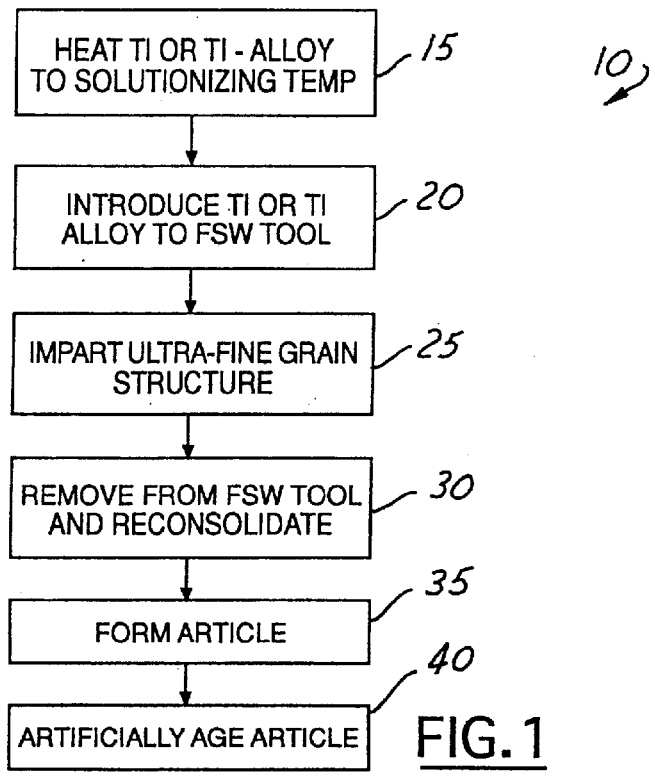
FIG. 1 is logic flow diagram for producing an ultra-fine grain titanium or titanium-alloy article from a titanium or titanium-alloy raw material feed source.

Referring now to FIG. 1, a logic flow diagram for producing a titanium or titanium-alloy article having an ultra-fine grain structure is shown generally as 10. The process starts in Step 15 by heating a coarse grain titanium or titanium-alloy raw material feed source to approximately a solutioning treatment temperature that is below its respective melting temperature. Next, in Step 20, the heated titanium or titanium-alloy material is then introduced into a friction stir processing tooling device.

In Step 25, the heated titanium or titanium-alloy raw material feed stock is stirred within the friction stir tooling device to fully homogenize the raw feed stock material and to impart an ultra-fine grain structure. The friction stir process raises the temperature of the raw material feed stock to a solutionizing treatment temperature. The stirring rate and length of time within the tooling device is dependent upon the type and amount of material introduced to the device, the temperature of the heated titanium or titanium-alloy material within the device, and the size of the chamber used for mixing the titanium or titanium-alloy material.

In Step 30, the homogenized raw material feed stock is removed from the tooling device and reconsolidated to form a pure titanium or titanium-alloy material having an ultra-fine grain particle size. In Step 35, the titanium or titanium-alloy material is subjected to normal manufacturing steps associated with typical aerospace articles or components, such as fasteners, including but not limited to cold-working and cold-forming, but not requiring the associated thermal or heat-treatment steps. This is shown further below in FIGS. 3A–E. Finally, in Step 40, the formed components are artificially-aged in an oven for a predetermined amount of time. For commercially pure (CPU) titanium, the titanium is kept in the oven for approximately 12 hours at between approximately 900 and 950 degrees Fahrenheit. The articles or components are then available for use. For the aerospace industry, these articles or components include fasteners, such as rivets, and other small parts such as shear clips and brackets for use on either spacecraft, aircraft, or other associated airframe component assemblies.

Figure 2:
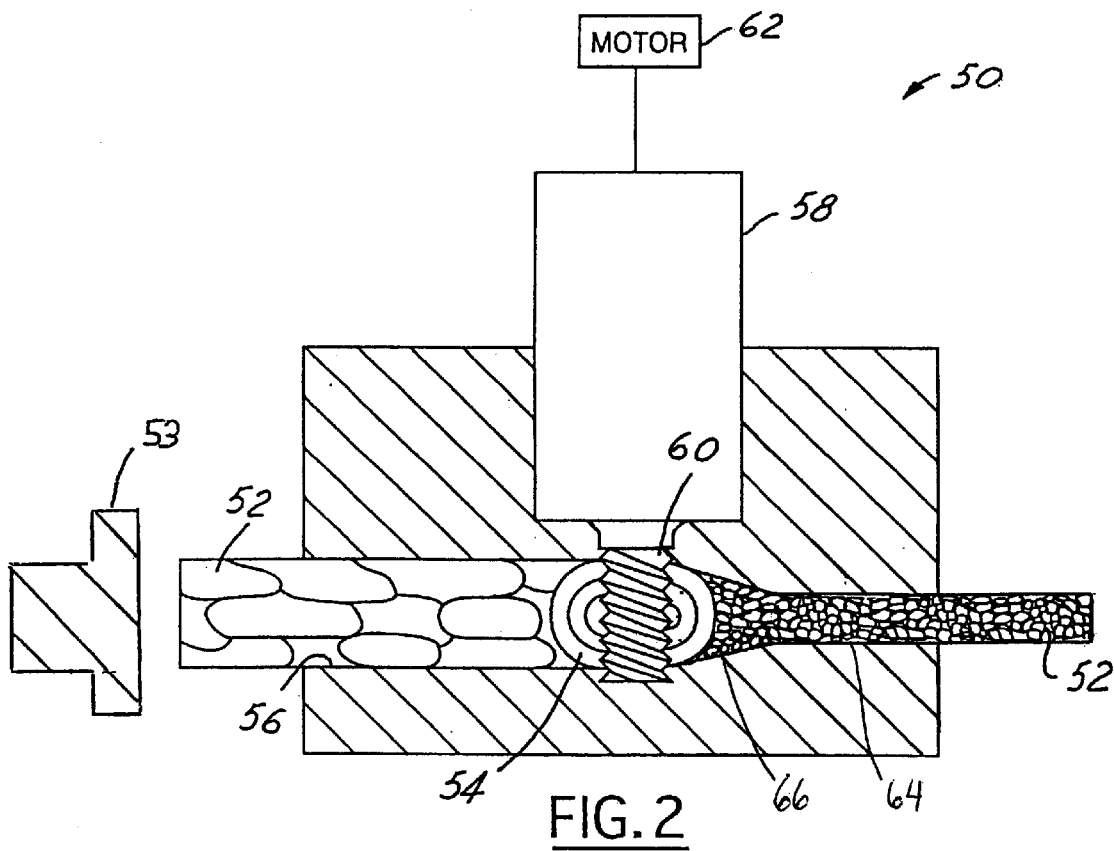
FIG. 2 is a sectional view of a friction stir process tooling device used in FIG. 1 according to a preferred embodiment of the present invention.
Figure 3A:
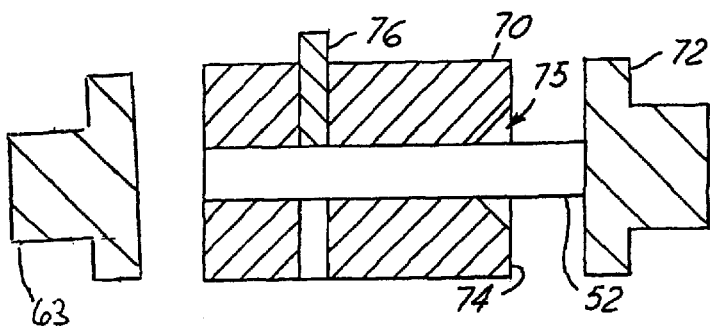
FIGS. 3A–3E are perspective views for forming a fastener by a cold-forming technique according to one preferred embodiment of the present invention from the ultra-fine grain titanium or titanium-alloy produced in FIG. 2.
Figure 3B:
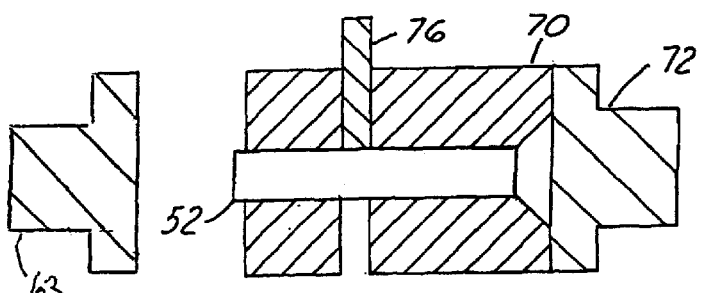
Figure 3C:
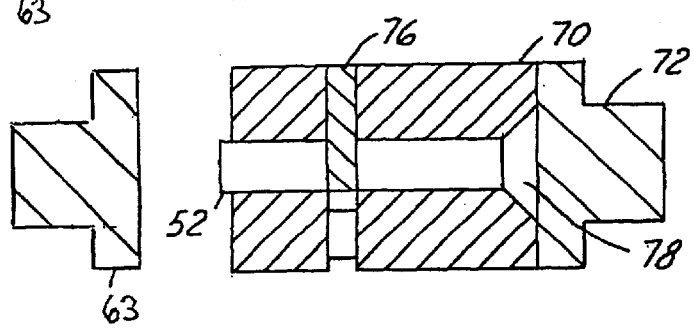
Figure 3D:
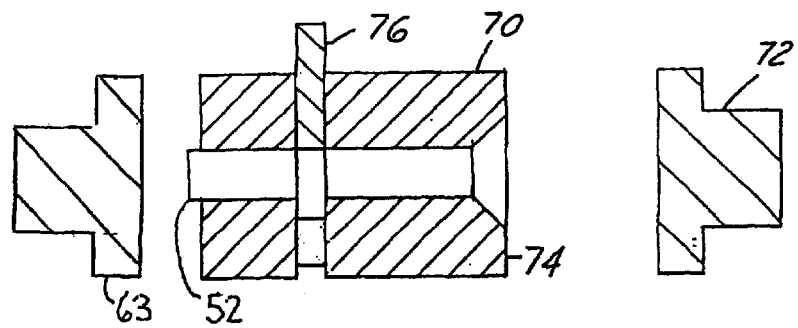
Figure 3E:
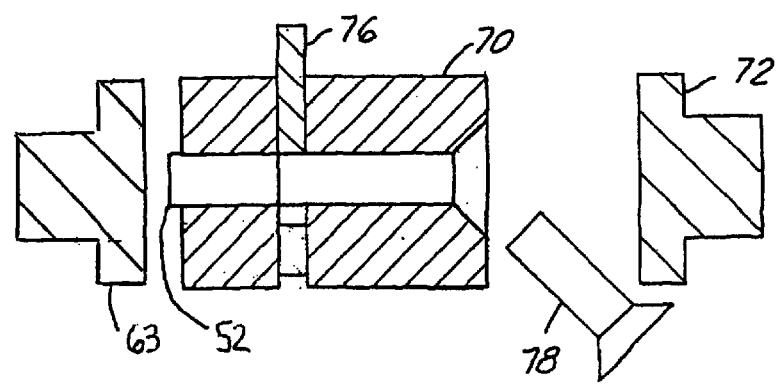

Referring now to FIG. 2, a sectioned view of a friction stir processing tool device is shown generally as 50. A quantity of coarse grain, heated titanium or titanium-alloy material 52 is introduced under pressure by a ram 53 to a stirring chamber 54 through an input-bore 56. The heated titanium or titanium-alloy material 52 having a grain size of approximately 0.5 millimeters is preferably introduced at a temperature slightly below its respective solutionizing and melting temperature. For pure titanium, the melting temperature is around 1700 degrees Fahrenheit.

The titanium-alloy material listed above may comprised of any titanium-alloy material as is well known in the art. Binary titanium alloys, such as β-Ti—Mo and α-Ti—Al, including two preferred compositions of commercially pure Ti-6Al-4V and Ti-5Al-2.5Sn are addressed by this invention.

The stirring chamber 54 has a stirring rod or cylinder 58 having a threaded end portion 60 in the preferred embodiment and is coupled to a motor 62 or similar rotational device that controls the rotational rate. The titanium or titanium-alloy material 52 contacts the rotating threaded end portion 60, thereby imparting work on the grain size and stirring the titanium or titanium-alloy material 52 above its solutionizing treatment temperature. For commercially pure (CP) titanium, the rotational rate is approximately 1000 revolutions per minute (RPM).

By the constant force that is applied to the ram 53, the titanium or titanium-alloy material 52 is forced through the stirring chamber 54 and exists through an outlet bore 64 having a grain size reduced to between approximately 5–10 micrometers as a result of the friction stirring process. A tapered opening 66 located between the stirring chamber 54 and the outlet bore 64 provides back pressure. The titanium or titanium-alloy material exists the friction stir process tooling device reconsolidated and possessing ultra-fine particle size.

As described in FIGS. 3A–E below, the ultra-fine grain titanium or titanium-alloy material 52 may then be further processed by a cold-forming technique to form a fastener 78 according to one preferred embodiment of the present invention.

As shown in FIGS. 3A–3E, the titanium or titanium-alloy is first bored into the die using a ram 63. The titanium or titanium-alloy material 52 is then shaped within the cold-forming die 70 by a forming or heading ram 72. The forming or heading ram 72 will reactively push against the titanium-alloy material 52 until it abuts against the outer surface 74 of the die 70, thereby completing filling the inner cavity 75 of the die 70 with the titanium or titanium-alloy material 52. Next, a shear device 76 or similar cutting device cuts the titanium or titanium-alloy material 52, thereby forming the fastener 78. The forming or heading ram 72 and the shear piece 76 then retract or withdraw to their normal positions and the formed fastener 78 is removed from the cavity 75 of the die 70. The fastener 78 may then be subsequently processed as is well known in the art to form the finished part.

Depending upon the level of cold-working performed on the titanium or titanium-alloy material 52, for example, the fastener 78 is optionally artificially-aged in an oven for a predetermined amount of time. For commercially pure (CP) titanium, the titanium material is kept in the oven for approximately 12 hours at between approximately 900 and 950 degrees Fahrenheit. Importantly, no further heat treating or thermal treating step is required. The fastener 78 is then available, for example, for use in the aerospace industry or construction industry.

Of course, while FIGS. 3A–3E show one possible manufacturing method for forming a fastener 78, other manufacturing techniques that are well known in the art may be used as well. For example, the fastener 78 may be made using a cold-working technique. Further, while FIGS. 3A–3E show the formation of a fastener 78, other types of fasteners, articles, or component parts may use a similar manufacturing technique. These include, but are not limited to, two-piece non-deformable shank fasteners such as threaded pins and lockbolts and one-piece deformable shank fasteners such as rivets.

The fasteners or rivets made from the ultra-fine grain titanium or titanium-alloy material have improved ductility and fracture toughness over prior art titanium or titanium-alloy fasteners. These fasteners are especially useful in applications such as in the aerospace industry. Additionally, the elimination of the heat or thermal treatment step eliminates sources of error and costs associated with the thermo-mechanical processing step. For example, the elimination of the thermal treatment alone is believed to save approximately 20% of the cost of manufacturing a fastener used in aerospace applications.

While the invention has been described in terms of preferred embodiments, it will be understood, of course, that the invention is not limited thereto since modifications may be made by those skilled in the art, particularly in light of the foregoing teachings.

What is claimed is:

1. A method for making a ultra-fine grain titanium or titanium-alloy article comprising the steps of:
   providing a coarse grain titanium or titanium-alloy material having a first grain size;
   heating said titanium or titanium-alloy material to a first temperature, said first temperature slightly below the solutionizing treatment temperature and melting temperature for said titanium or titanium-alloy material;
   introducing said heated titanium or titanium-alloy material into a friction stir processing tooling device;
   stirring said solutionized titanium or titanium-alloy material within said friction stir processing device for a predetermined amount of time sufficient to impart an ultra-fine grain structure on said heated titanium or titanium-alloy material;
   removing and reconsolidating said ultra-fine grain titanium or titanium-alloy material;
   forming an article from said ultra-fine grain titanium or titanium-alloy material; and
   artificially-aging said article to form the ultra-fine grain titanium or titanium-alloy article.

2. The method of claim 1, wherein said titanium-alloy material is comprised of commercially pure Ti-6Al-4V.

3. A The method of claim 1, wherein said titanium-alloy material comprises of commercially pure Ti-5Al-2.5Sn.

4. The method of claim 1, wherein said titanium-alloy material is selected from the group consisting of commercially pure T1-5Al-2.5Sn, β-Ti—Mo, and α-Ti—Al.

5. The method of claim 1, wherein the steps of introducing said heated titanium or titanium-alloy material to a friction stir processing tooling device, stirring said heated titanium or titanium-alloy material, and removing and reconsolidating said ultra-line grain titanium or titanium-alloy material comprises the steps of:

introducing said heated titanium or titanium-alloy material under pressure by a ram to a stirring chamber of a friction stir processing tooling device through an input bore;

contacting said titanium or titanium-alloy material with a rotating threaded portion of a stirring rod for a predetermined amount of time sufficient to impart work into said coarse-grained heated titanium or titanium-alloy material to form an ultra-fine grain structure on said heated titanium or titanium-alloy material;

removing said ultra-fine grain titanium or titanium-alloy material from said stirring chamber and said friction stir processing tooling device through an outlet bore; and reconsolidating said ultra-fine grain titanium or titanium-alloy material.

6. The method of claim 1, wherein the step of stir processing said heated titanium or titanium-alloy material within said friction stir processing tool device for a predetermined amount of time sufficient to impart an ultra-fine grain structure into said heated titanium or titanium-alloy material comprises the step of friction stir processing said heated titanium or titanium-alloy material within said friction stir processing tool device for a predetermined amount of time sufficient to impart an ultra-fine grain structure into said heated titanium or titanium-alloy material using a motor-driven device.

7. The method of claim 1, wherein the step of friction stir processing said heated titanium or titanium-alloy material within said friction stir processing tool device for a predetermined amount of time sufficient to impart an ultra-fine grain structure into said heated titanium or titanium-alloy material comprises the step of friction stir processing said heated titanium or titanium-alloy material within said friction stir processing tool device for a predetermined amount of time sufficient to impart an ultra-fine grain structure into said heated titanium or titanium-alloy material, wherein said ultra-fine grain structure has a grain size between approximately 5 and 10 micrometers.

8. The method of claim 1, wherein the step of providing a coarse-grain titanium or titanium-alloy material having a first grain size comprises the step of providing a coarse-grain titanium or titanium-alloy material having a grain size of approximately 0.5 millimeters.

9. The method of claim 1, wherein the step of mechanically-forming an article from said ultra-fine grain titanium or titanium-alloy material comprises the step of cold-forming an article from said ultra-fine grain titanium or titanium-alloy material.

10. The method of claim 1, wherein the step of mechanically-forming an article from said ultra-fine grain titanium or titanium-alloy material comprises the step of cold-working an article from said ultra-fine grain titanium or titanium-alloy material.

11. The method of claim 1, wherein the step of artificially-aging said article to form the ultra-fine grain titanium or titanium-alloy article comprises the step of artificially-aging said article in an oven for approximately 12 hours at between approximately 900 and 950 degrees Fahrenheit when said titanium or titanium-alloy material comprises commercially pure titanium.

12. The method of claim 1, wherein the step of heating said titanium or titanium-alloy material to a first temperature comprises the step of heating said titanium or titanium-alloy material to approximately 1700 degrees Fahrenheit when said titanium or titanium-alloy comprises commercially pure titanium.

13. The method of claim 1, wherein the step of forming an article comprises the step of mechanically-forming an article from said ultra-fine grain titanium or titanium-alloy material, said article selected a one-piece deformable shank and a two-piece non-deformable shank fastener a fastener.

14. The method of claim 9, wherein cold-forming an article from said ultra-fine grain titanium or titanium-alloy material comprises cold-forming a fastener or other fastening article from said ultra-fine grain titanium or titanium-alloy material.

15. The method of claim 14, wherein cold-forming a fastener or other fastening article comprises:

introducing an ultra-fine grain titanium or titanium-alloy material within a cavity of a cold-forming die, said cavity having the general shape of the fastener or other fastening article or device;

cutting said ultra-fine grain titanium or titanium-alloy material;

removing said cut ultra-fine grain titanium or titanium-alloy material from said cold-forming die; and artificially-aging said cut ultra-fine grain titanium or titanium-alloy material.

16. The method of claim 15, wherein introducing an ultra-fine grain titanium or titanium-alloy material within a cavity of a cold-forming die comprises introducing an ultra-fine grain titanium or titanium-alloy material within a cavity of a cold-forming die using a ram.

17. The method of claim 15, wherein cutting said ultra-fine grain titanium or titanium-alloy material comprises cutting said ultra-fine grain titanium or titanium-alloy material using a shear device.

* * * * *

UNITED STATES PATENT AND TRADEMARK OFFICE
CERTIFICATE OF CORRECTION

PATENT NO.   : 6,638,381 B2
DATED        : October 28, 2003
INVENTOR(S)  : Steven G. Keener and Edward Litwinski It is certified that error appears in the above-identified patent and that said Letters Patent is hereby corrected as shown below:

Column 3,
Line 13, replace paragraph with the following:
-- Referring now to Figure 2, a sectioned view of a friction stir processing tool device is shown generally as 50. A quantity of coarse grain, heated titanium or titanium-alloy material 52 is introduced under pressure by a ram 53 to a stirring chamber 54 through an input-bore 56. The heated titanium or titanium-alloy material 52 having a grain size of approxiamately 0.5 millimeters is preferably introduced at a temperature slightly below its respective solutionizing and melting temperature. For pure titanium, the melting temperature is around 1700 degrees Celsius.

Column 6,
Line 16, should read as following:
-- The method of claim 1, wherein the step of heating said titanium or titanium-alloy material to a first temperature comprises the step of heating said titanium or titanium-alloy material to approximately 1700 degrees Celsius when said titanium or titanium-alloy comprises commercially pure titanium.

Signed and Sealed this

Tenth Day of May, 2005

JON W. DUDAS
*Director of the United States Patent and Trademark Office*